US012536389B2

United States Patent
Ati et al.

(10) Patent No.: US 12,536,389 B2
(45) Date of Patent: Jan. 27, 2026

(54) TRANSLATION SYSTEM

(71) Applicant: Abu Dhabi University, Abu Dhabi (AE)

(72) Inventors: Modafar Kadim Ati, Abu Dhabi (AE); Reem Al Bostami, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 395 days.

(21) Appl. No.: 17/838,199

(22) Filed: Jun. 11, 2022

(65) Prior Publication Data

US 2023/0409842 A1     Dec. 21, 2023

(51) Int. Cl.
*G06F 40/58* (2020.01)
*G06F 40/49* (2020.01)
*G06V 40/20* (2022.01)

(52) U.S. Cl.
CPC .............. *G06F 40/58* (2020.01); *G06F 40/49* (2020.01); *G06V 40/28* (2022.01)

(58) Field of Classification Search
CPC .......... G06F 40/58; G06F 40/49; G06V 40/28
See application file for complete search history.

(56) References Cited

U.S. PATENT DOCUMENTS

| 9,544,656 | B1* | 1/2017 | Nichols | G06V 40/28 |
| 11,610,356 | B2* | 3/2023 | Sharma | G06T 17/00 |
| 2006/0174315 | A1* | 8/2006 | Kim | H04N 21/435 |
| | | | | 725/136 |
| 2014/0046661 | A1* | 2/2014 | Bruner | H04N 21/6582 |
| | | | | 704/235 |
| 2014/0324412 | A1* | 10/2014 | Itamoto | G10L 15/00 |
| | | | | 704/3 |
| 2016/0203360 | A1* | 7/2016 | Alvarez | G06V 40/28 |
| | | | | 345/156 |
| 2017/0185375 | A1* | 6/2017 | Martel | G06F 3/165 |
| 2017/0236450 | A1* | 8/2017 | Jung | G06F 3/167 |
| | | | | 704/3 |
| 2020/0167556 | A1* | 5/2020 | Kaur | G06F 3/0304 |
| 2021/0043110 | A1* | 2/2021 | Jung | G10L 15/24 |

OTHER PUBLICATIONS

Sastry et al. "Sign Language Conversion Tool (SLCTooL) Between 30 World Sign Languages". Smart Innovation, Jan. 2018 (Year: 2018).*

* cited by examiner

*Primary Examiner* — Jesse S Pullias

(57) ABSTRACT

A device includes memory and a processor. The device receives electronic information associated with sign language. The device receives an electronic instruction to translate the sign language. The device translates the electronic information into the sign language.

14 Claims, 15 Drawing Sheets

TRANSLATION SYSTEM

BACKGROUND

Throughout the world, there are numerous languages spoken. In addition to a variety of spoken languages, sign language, for hearing impaired individuals, is also provided such that many languages (e.g., English, French, Arabic) can also be expressed in a particular type of sign language. However, there is no automated system that provides for translating a sign language associated with one language into another sign language associated with another language.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may allow for a single system to translate a) a sign language associated with a first language into a sign language associated with a second language, b) a sign language associated with a first language into text associated with the first language, c) a sign language associated with a first language into text associated with a second language, d) text associated with a first language into a sign language associated with the first language, and e) text associated with a first language into a sign language associated with a second language.

Accordingly, the systems, devices, and/or methods described herein may automatically generate a translation between various types of sign language, between text, and/or between sign language and text. Thus, the translation can occur for individuals located remotely from each other (i.e., not physically in each other's presence) via the use of electronic communications. Accordingly, the systems, devices, and/or methods are an improvement over human-to-human translation as that requires a translator to be physically present or requires a translator to send information that would take longer and would not be automatic.

Figure 1:
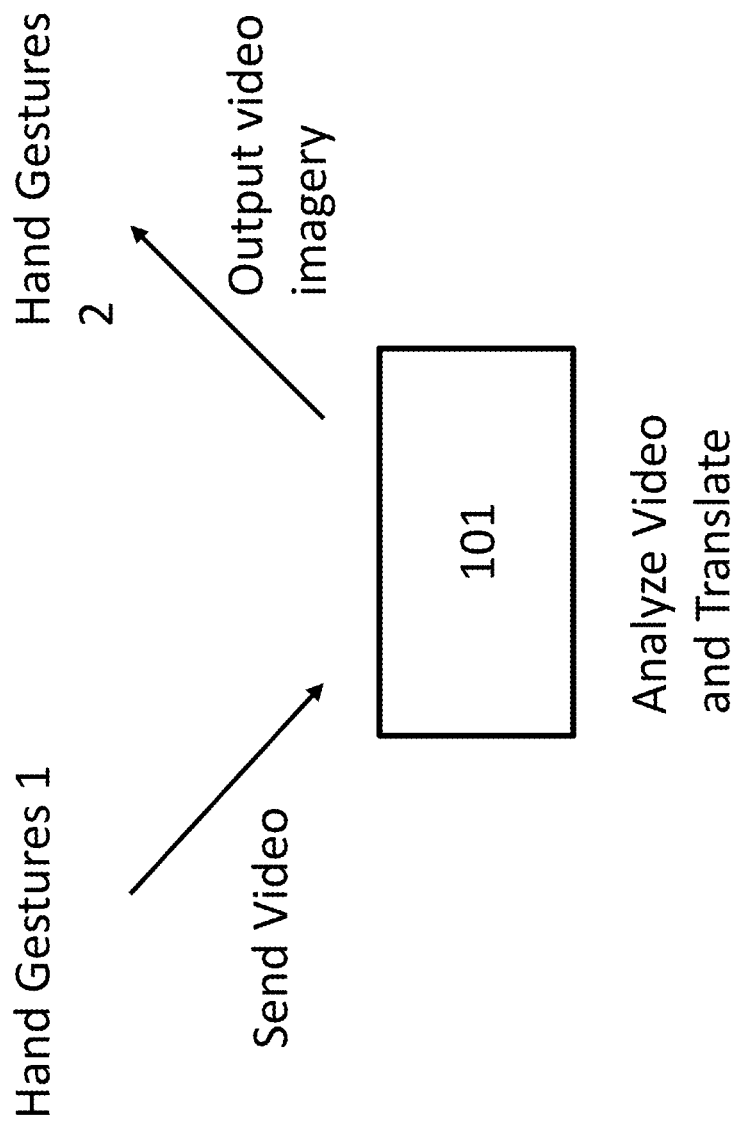
FIG. 1 is an example diagram of translation of one language to another language.

FIG. 1 shows an example translation between one sign language associated with one language (e.g., Arabic) and another sign language associated with a second language (e.g., Chinese). As shown in FIG. 1, hand gestures 1 are made and are associated with the Arabic word for "hello." A video system associated with computing device 101 captures a video of hand gestures 1 and computing device 101 then analyzes the hand gestures 1 so as to translate hand gestures 1 into hand gestures 2 associated with the Chinese sign language for the word "hello." Thus, in this non-limiting example, an output imagery (e.g., a video communication) of the Chinese sign language for the word "hello" is electronically displayed.

Figure 2:
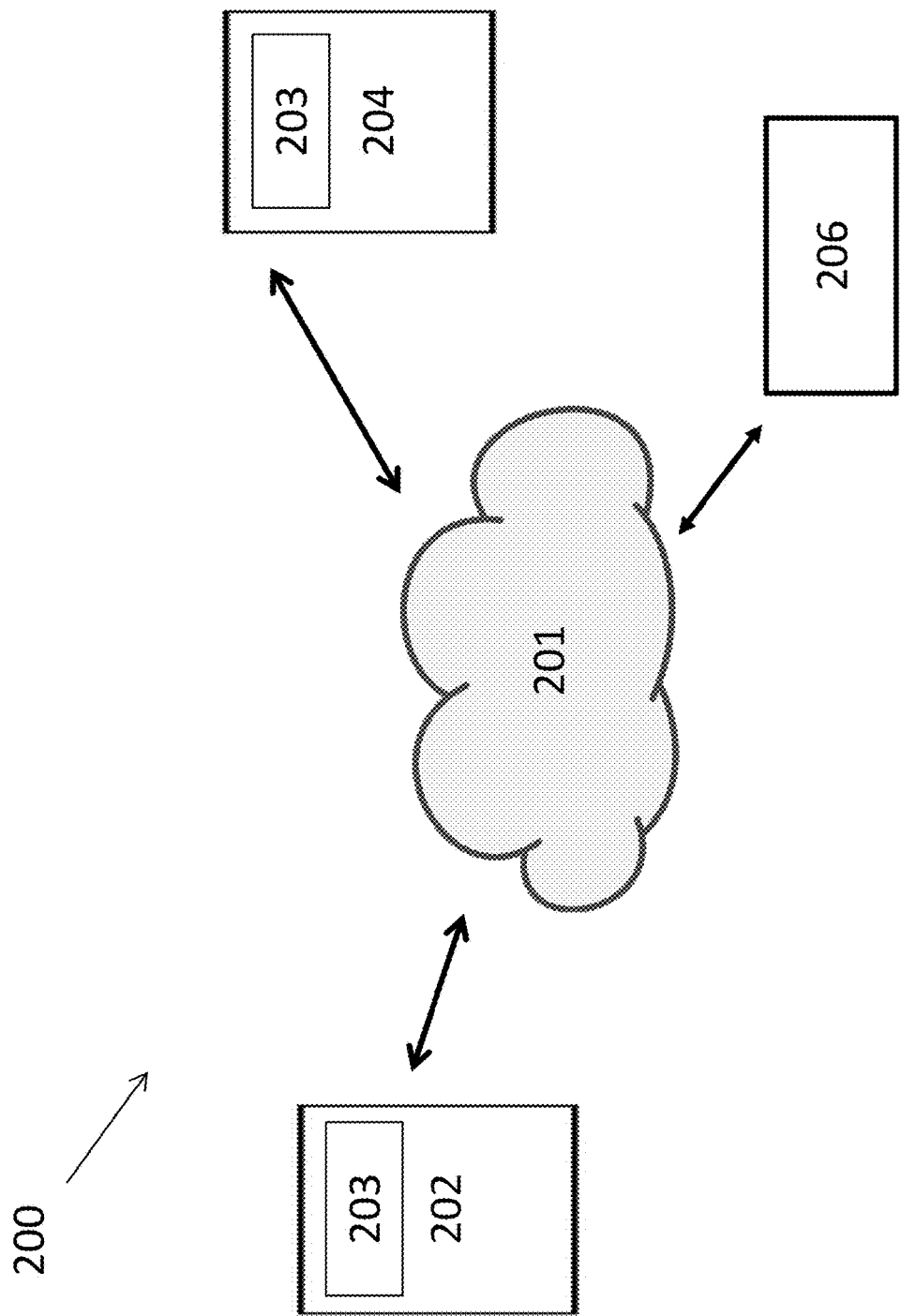
FIG. 2 is a diagram of a network environment.

FIG. 2 is a diagram of example environment 200 in which systems, devices, and/or methods described herein may be implemented. FIG. 2 shows network 201, application 203, user device 202, user device 204, and translation system 206.

Network 201 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network.

In embodiments, network 110 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 202 and/or 204 may include any computation or communications device that is capable of communicating with a network (e.g., network 110). For example, user device 202 and/or user device 204 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 202 and/or 204 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 202 and/or 204. User device 202 and/or 204 may have a touch screen and/or a keyboard that allows a user to electronically interact with an electronic application. In embodiments, a user may swipe, press, or touch user device 202 and/or 204 in such a manner that one or more electronic actions will be initiated by user device 202 and/or 204 via an electronic application.

User device 202 and/or 204 may include a variety of applications, such as, for example, biometric a verification application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Electronic application 203 may be capable of interacting with user device 202, user device 204, and/or translation system 206 to automatically and electronically receive electronic information for one or more persons. In embodiments, electronic application 203 may be electronically configured to receive video and/or graphical image that are associated with sign language gestures and/or text. In embodiments, electronic application 203 may send video, text, and/or graphical imagery to translation system 206 and, based on the sent electronic information, receive video, text, and/or graphical imagery from translation system 206.

In addition, electronic application 203 may also be electronically configured to receive icons, graphical images, buttons, emojis, and/or any other electronic information. While FIG. 2 shows electronic application 203 on user device 202 and user device 204, some or all the electronic processes performed by electronic application 203 may be stored by translations system 206.

Translation system 206 may include one or more computational or communication devices that gather, process, store, and/or provide information relating to one or more electronic pages associated with electronic application 203 that is searchable and viewable over network 201. In embodiments, translation system 206 may include one or more servers. In embodiments, the one or more servers of translation system 206 may include one or more databases. In embodiments, the one or more databases may store electronic information associated with multiple sign language gestures associated with multiple spoken languages and multiple language text (i.e., words) associated with multiple spoken languages. In embodiments, translation system 206 may receive electronic information from electronic application 203, translate the electronic information, and send the translated electronic information to electronic application 203 on the same device that sent the electronic information or translations system 206 sends the electronic information to electronic application 203 on a device that is different from the device that sent the electronic information to translation system 206.

Figure 3:
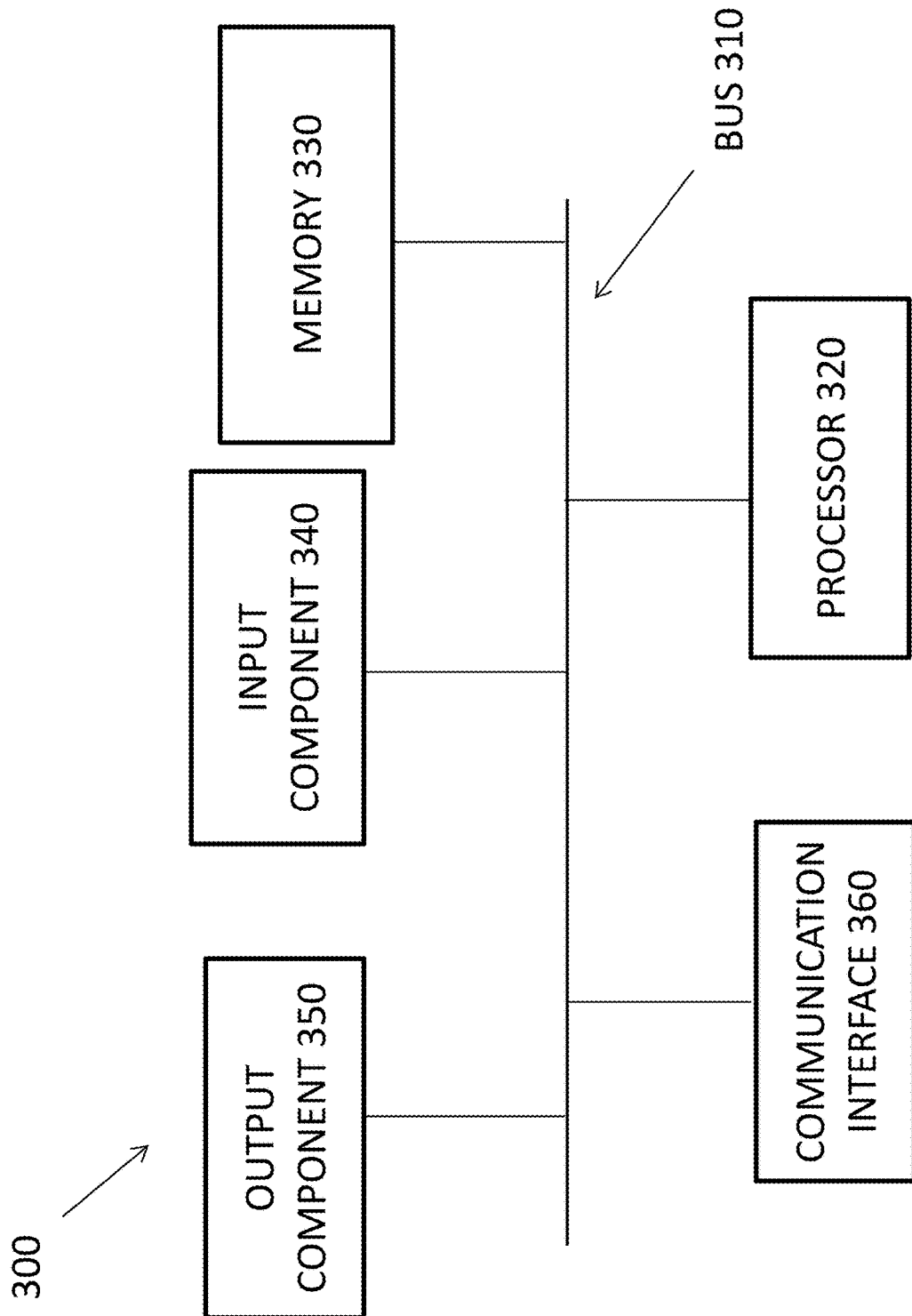
FIG. 3 is a diagram of an example computing device.

FIG. 3 is a diagram of example components of a device 300. Device 300 may correspond to user device 202, user device 204, and translation system 206. Alternatively, or additionally, user device 202, user device 204, and translation system 206 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 110.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
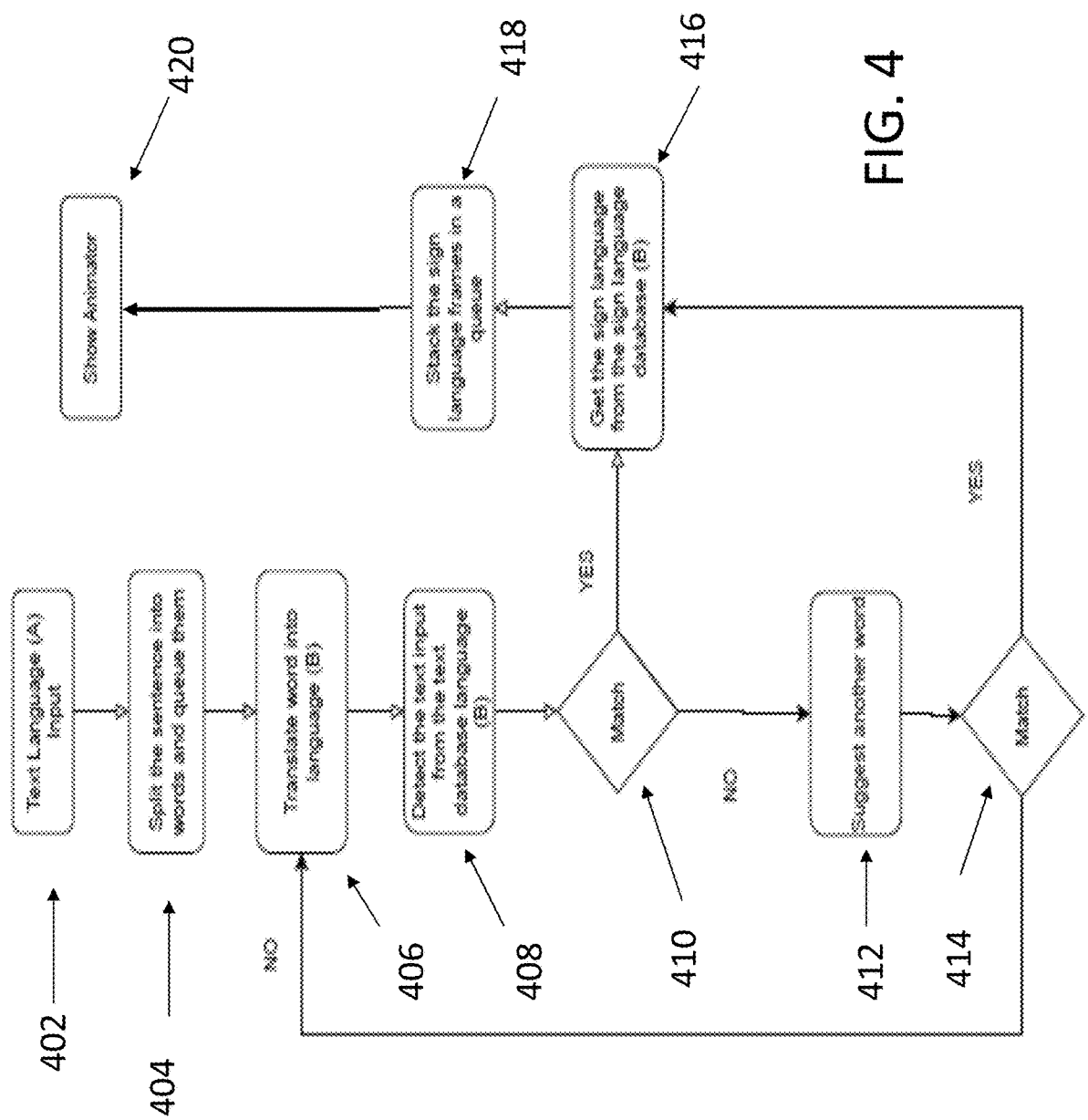
FIG. 4 is an example flow diagram.

FIG. 4 describes an example communication flow process 400 for translating text associated with spoken language A into sign language associated with spoken language B. In embodiments, the steps of flow process may be conducted by electronic application 203, user device 202, user device 204, and/or translation system 206.

At step 402, text language associated with spoken language A is inputted into electronic application 203 via a graphical user interface that is displayed on a user device (e.g., user device 202, user device 204). At step 404, electronic application 203 analyze the inputted text language and may split the inputted text language into separate words so that each word can be translated individually. At step 406, electronic application 203 and/or translation system 206 (which is a part of electronic application 203 or is in communication with electronic application 203) may translate the text language associated with spoken language A into the text language associated with spoken language B.

At step 408, electronic application 203 and/or translation system 206 may conduct a search of one or more databases for the translated text language associated with language B. At step 410, if the translated word is found and is associated with sign language stored in the one or more databases, then there is a match (step 410—YES), then, at step 416, electronic application 203 and/or translation system 206 may then associate the sign language associated with the translated text language.

However, if the translated word is not found and no associated sign language is not found in the one or more databases, then there is no match (step 410—NO). Accordingly, at step 412, electronic application 203 and/or translation system 206 may, based on the inputted text language A and words similar to the translated text language (which at this flow process step is determined to be incorrect), recommend another word associated with spoken language B. If the recommended word does have a match (step 414—YES) with associated sign language in the one or more databases, then, at step 416, a match between sign language and the translated word associated with spoken language B is made. If the recommended word does not have a match (Step 414—NO), then the recommended word is sent to step 404 and is again translated. In embodiments, if text cannot be matched with sign language, then after a particular number of attempts, flow process 400 may stop.

At step 418, electronic application 203 and/or translation system 206 may stack each of the images (e.g., frames) of each word associated with a sign language image to generate video imagery that, at step 420, displays the generated video on a graphical user interface that is the sign language associated with language B that was translated from the inputted text associated with language A.

Figure 5:
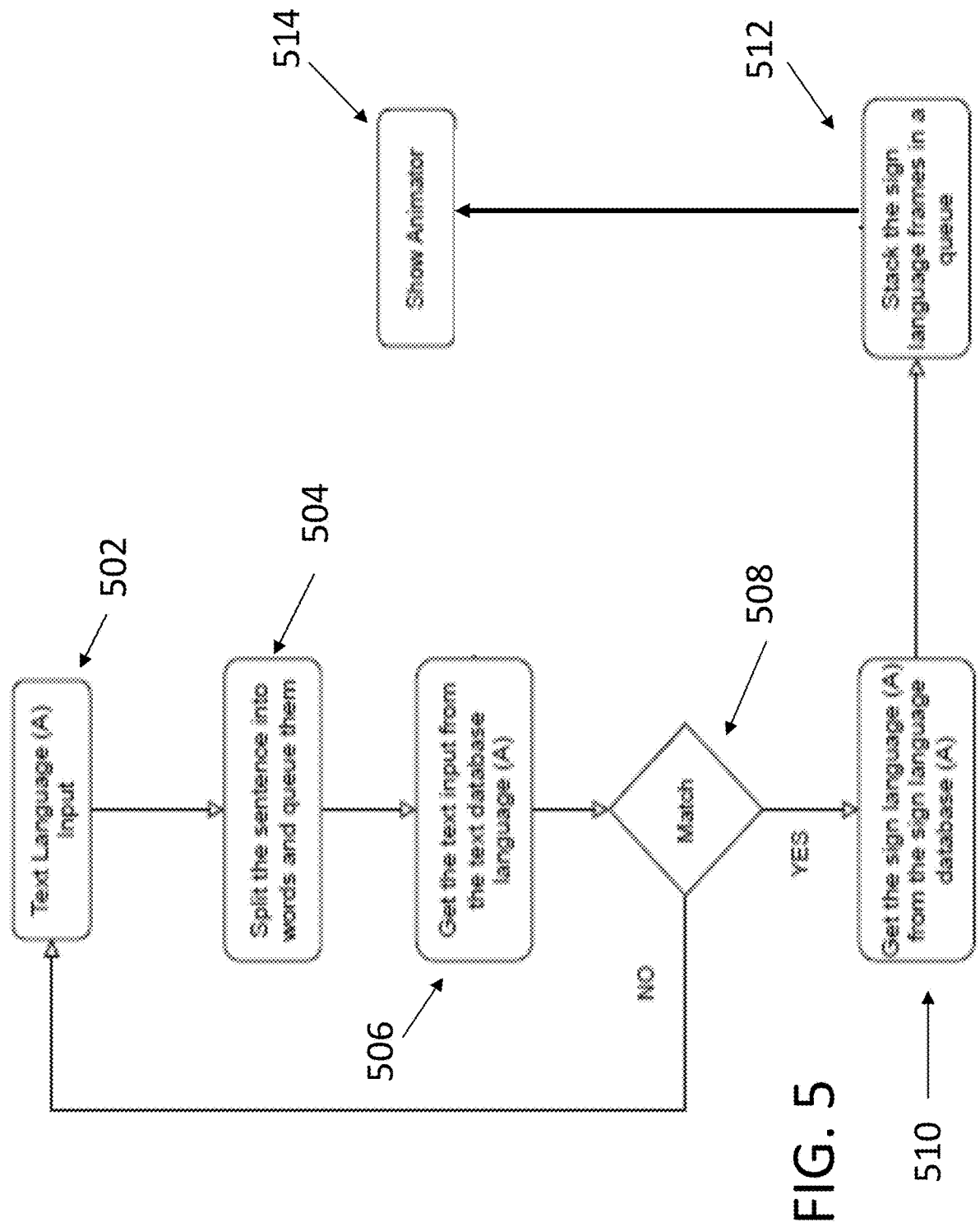
FIG. 5 is an example flow diagram.

FIG. 5 describes an example flow process 500 for translating text associated with spoken language A into sign language associated with spoken language A. In embodiments, the steps of flow process may be conducted by electronic application 203, user device 202, user device 204, and/or translation system 206.

At step 502, text language associated with spoken language A is inputted into electronic application 203 via a graphical user interface that is displayed on a user device (e.g., user device 202, user device 204). At step 504, electronic application 203 analyze the inputted text language and may split the inputted text language into separate words so that each word can be translated individually. At step 506, electronic application 203 and/or translation system 206 (which is a part of electronic application 203 or is in communication with electronic application 203) may match the inputted words with text stored in one or more databases. If there is a match (step 508—YES), then sign language associated with language A that matches the inputted language at step 502. If there is no match (step 508—NO), then electronic application 203 may generate an electronic message to a user of a user device requesting that the text language be re-inputted or may recommend another word and/or words based on the original inputted text. In embodiments, if the user re-inputs the word and there is still no match, process 500 may stop or may stop after a particular number of attempts.

At step 512, electronic application 203 and/or translation system 206 may stack each of the images (e.g., frames) of each word associated with a sign language image to generate video imagery that, at step 514, displays the generated video on a graphical user interface that is the sign language associated with language A that was translated from the inputted text associated with language A.

Figure 6:
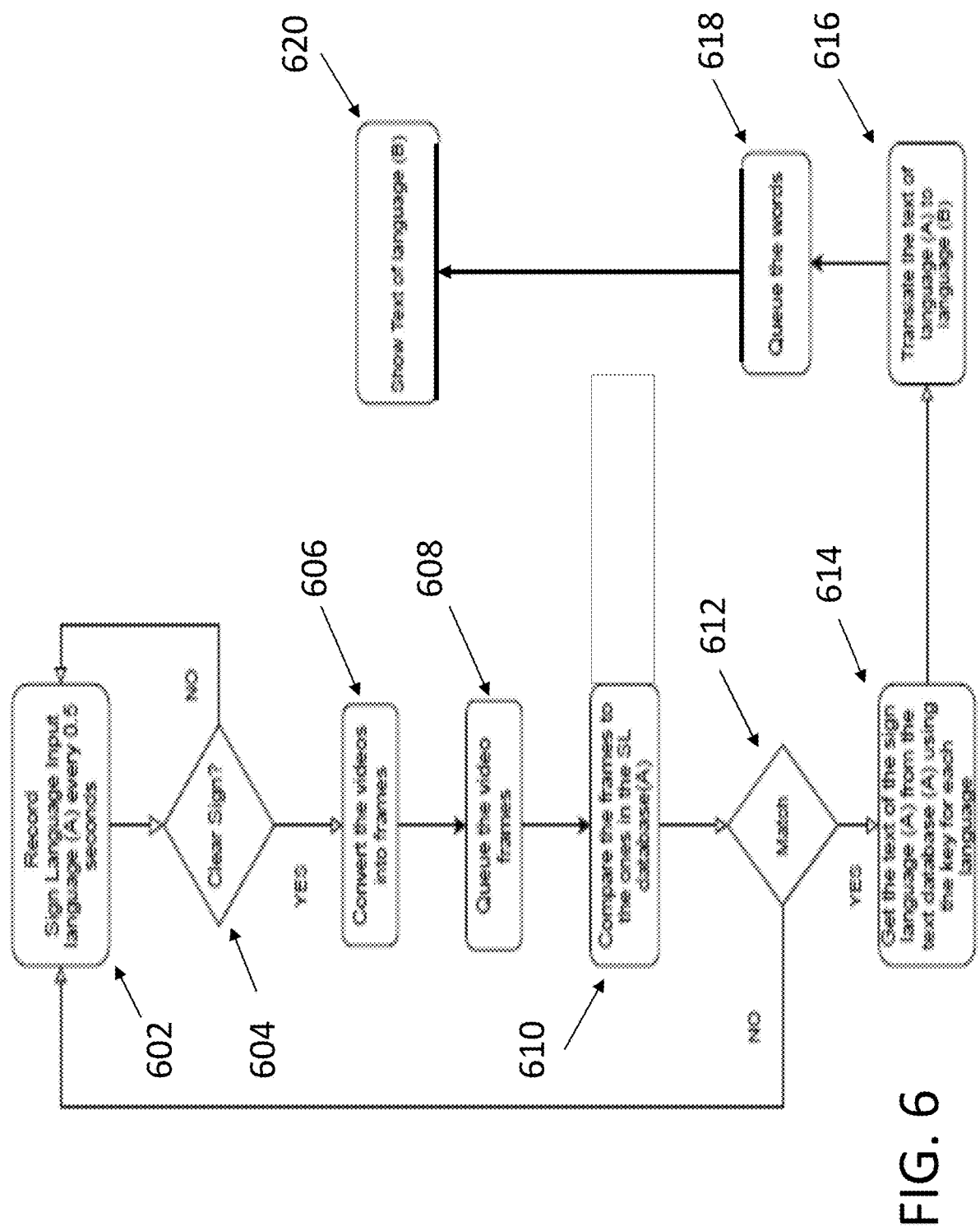
FIG. 6 is an example flow diagram.

FIG. 6 describes an example flow process 600 for translating sign language associated with spoken language A into text associated with spoken language B. In embodiments, the steps of flow process may be conducted by electronic application 203, user device 202, user device 204, and/or translation system 206.

At step 602, sign language associated with spoken language A is made by a person and an electronic camera associated a user device (e.g., user device 202) takes a video. As electronic application 203 is being used on the user device, the electronic camera is controlled by electronic application 203 and the sign language is recorded every 0.5 seconds (or another time interval based on the type of sign language and the type spoken language). Once the sign language is recorded, at step 604, the video is analyzed by electronic application 203 and/or translation system 206 to determine whether the sign language in the electronic video is clear, such that there is no blurring or other errors in the electronic video. If the electronic video is not considered to be clear (step 604—NO), then electronic application 203 may generate an electronic message (displayed on a user device screen) for a user to re-record the sign language associated with spoken language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If the electronic video is considered clear (step 604—YES), then, at step 606, the electronic video is converted into frame segments. In embodiments, each frame segment may be associated with multiple frames for each perceived word or one or more frames for each sentence in the electronic video. At step 608, electronic application 203 and/or translation system 206 queues the frames such that the frames may be further analyzed by electronic application 203 and/or translation 206. At step 610, the frames are analyzed by electronic application 203 and/or translation system 206 to determine whether each of the frames matches text associated with the sign language imagery stored in one or more databases. If each of the frames or a percentage of the frames over a particular threshold (e.g., 80%, 90%, etc.) is not matched with text in the one or more stored databases (step 612—NO), then electronic application 203 and/or translation system 206 sends an electronic message (displayed via a display screen of a user device) for a user to re-record the sign language associated with language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If each of the frames or a percentage of the frames over a particular threshold (e.g., 80%, 85%, etc.) matches with text stored in one or more stored databases (step 612—YES), then, at step 614, electronic application 203 and/or translation system 206 retrieves the text information from the one or more databases. In embodiments, electronic application 203 and/or translation system 206 uses a key (associated with a particular database) that is associated with a particular text and particular sign language imagery.

At step 616, the retrieved text language associated with language A is then translated, by electronic application 203 and/or translation system 206, into text language associated with language B, based on one or more databases. At step 618, electronic application 203 and/or translation system 206 queues the word such that the words are in a grammatically correct order as based on the requirements of language B.

At 620, electronic application 203 and/or translation system 206 displays the text associated with language B that was translated from the sign language associated with language A.

Figure 7:
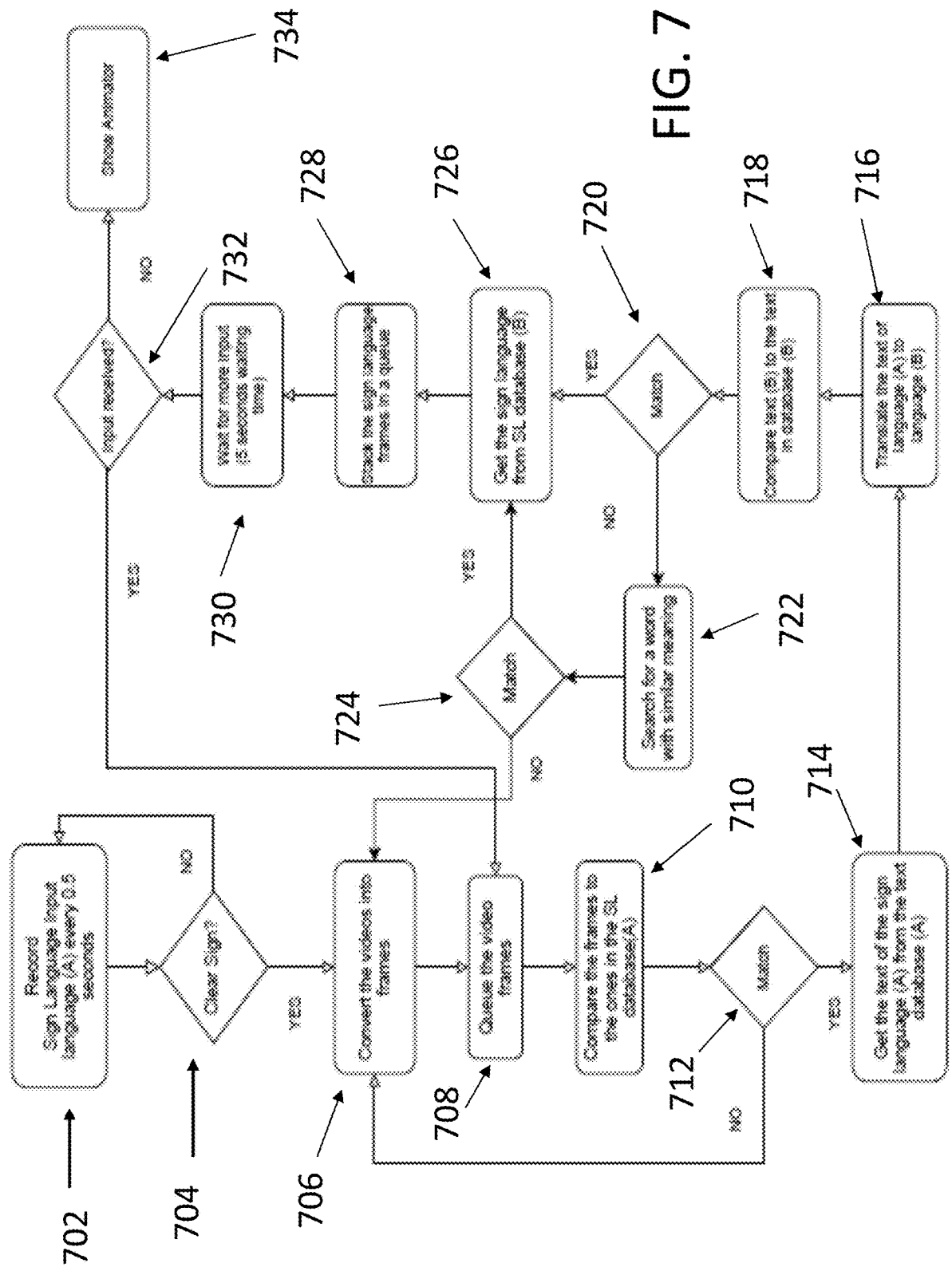
FIG. 7 is an example flow diagram.

FIG. 7 describes an example flow process 700 for translating sign language associated with spoken language A into text associated with spoken language B. In embodiments, the steps of flow process may be conducted by electronic application 203, user device 202, user device 204, and/or translation system 206.

At step 702, sign language associated with spoken language A is made by a person and an electronic camera associated a user device (e.g., user device 202) takes a video. As electronic application 203 is being used on the user device, the electronic camera is controlled by electronic application 203 and the sign language is recorded every 0.5 seconds (or another time interval based on the type of sign language and the type spoken language). Once the sign language is recorded, at step 704, the video is analyzed by electronic application 203 and/or translation system 206 to determine whether the sign language in the electronic video is clear, such that there is no blurring or other errors in the electronic video. If the electronic video is not considered to be clear (step 704—NO), then electronic application 203 may generate an electronic message (displayed on a user device screen) for a user to re-record the sign language associated with spoken language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If the electronic video is considered clear (step 704—YES), then, at step 706, the electronic video is converted into frame segments. In embodiments, each frame segment may be associated with multiple frames for each perceived word or one or more frames for each sentence in the electronic video. At step 708, electronic application 203 and/or translation system 206 queues the frames such that the frames may be further analyzed by electronic application 203 and/or translation 206. At step 710, the frames are analyzed by electronic application 203 and/or translation system 206 to determine whether each of the frames matches text associated with the sign language imagery stored in one or more databases. If each of the frames or a percentage of the frames over a particular threshold (e.g., 80%, 90%, etc.) is not matched with text in the one or more stored databases (step 712—NO), then electronic application 203 and/or translation system 206 sends an electronic message (displayed via a display screen of a user device) for a user to re-record the sign language associated with language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If each of the frames or a percentage of the frames over a particular threshold (e.g., 80%, 85%, etc.) matches with text stored in one or more stored databases (step 712—YES), then, at step 714, electronic application 203 and/or translation system 206 retrieves the text information from the one or more databases. In embodiments, electronic application 203 and/or translation system 206 uses a key (associated with a particular database) that is associated with a particular text and particular sign language imagery.

At step 716, the retrieved text language associated with language A is then translated, by electronic application 203 and/or translation system 206, into text language associated with language B, based on one or more databases. At step 718, electronic application 203 and/or translation system 206 compares text B to text stored in a database. At 720, electronic application 203 and/or translation system 206 determines whether there is match between the translated text with the text stored in the database. If there is no match (Step 720—NO), electronic application 203 and/or translation system 206, at step 722, searches for a word with a similar meaning. If there is no match (Step 722—NO), then electronic application 203 and/or translation system 206 will go back to step 706 and convert the video into frames again. In embodiments, if the flow process reaches step 722 and another similar word is not found, then electronic application 203 and/or translation system 206 will stop and delay the translation process for a particular period of time.

If there is a match (Step 720—YES or Step 724—YES), electronic application 203 and/or translation system 206, based on the match, obtains the sign language associated with language B (step 726) from a database that is related to the text language stored in the database. At step 728, electronic application 203 and/or translation system 206 stacks the sign language in a queue so that the sign language is shown in an order that can be understood by a person who understands sign language associated with language B. At step 730, electronic application 203 and/or translation system 206 may wait for about five seconds if there any additional sign language information is to be inputted. In embodiments, electronic application 203 and/or translation system 206 may generate an electronic message requesting whether a user (of a user device) would like to input additional sign language associated with language A.

If additional sign language associated with language A is inputted (step 732—YES), then electronic application 203 and/or translation system 206 may repeat steps 706 to 730 to translate the additional sign language associated with language A into sign language associated with language B. In embodiment, step 730 may occur only request additional information a particular number of times before electronic application 203 and/or translation system 206 determines that step 730 is no longer needed and process 700 goes from step 728 to step 734.

If no additional sign language is inputted (step 732—NO), then electronic application 203 and/or translation system

206 may display (via a graphical user interface) the translated sign language associated with language B.

Figure 8:
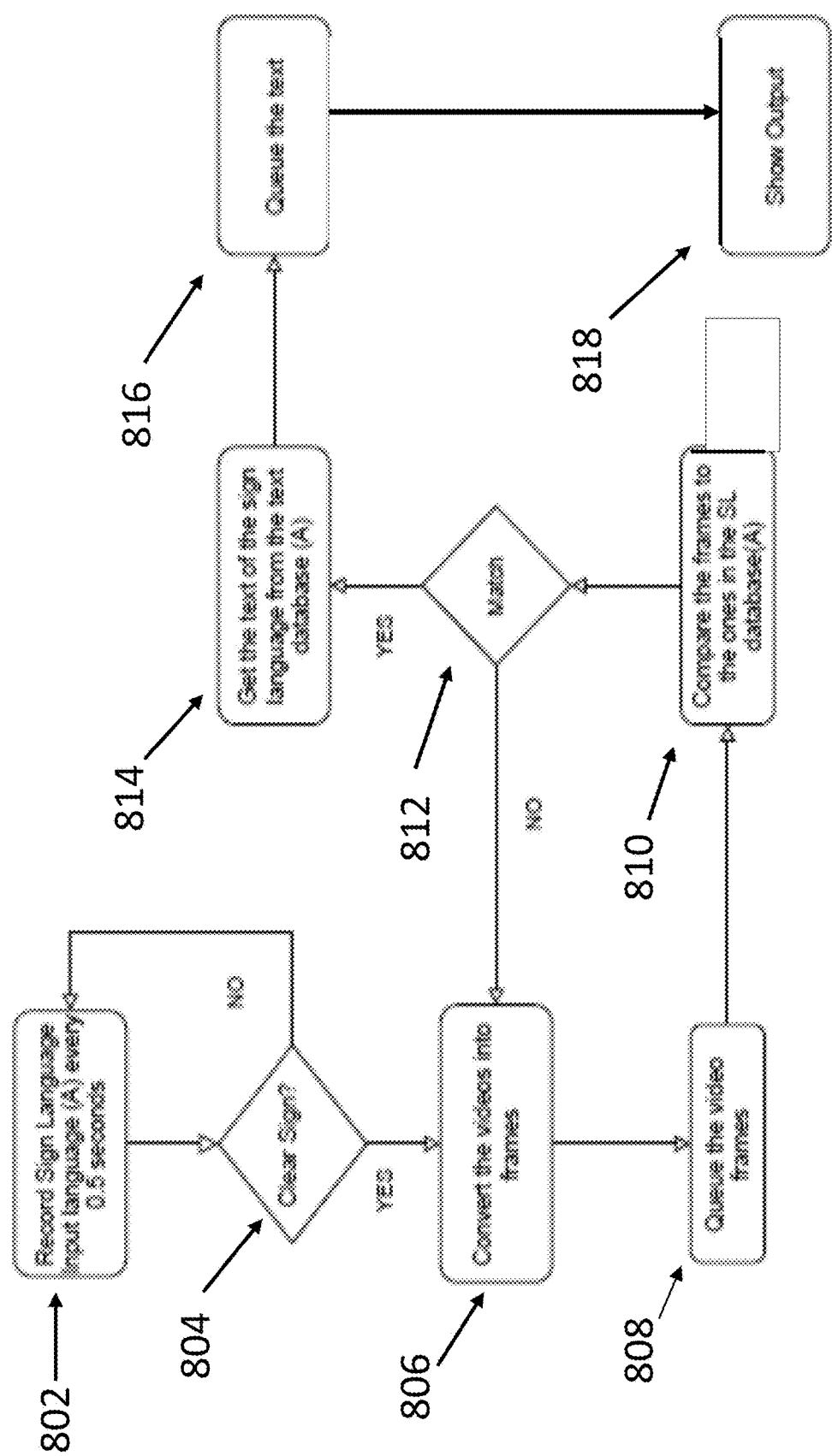
FIG. 8 is an example flow diagram.

FIG. 8 describes an example flow process 800 for translating sign language associated with spoken language A into text associated with spoken language A. In embodiments, the steps of flow process may be conducted by electronic application 203, user device 202, user device 204, and/or translation system 206.

At step 802, sign language associated with spoken language A is made by a person and an electronic camera associated a user device (e.g., user device 202) takes a video. As electronic application 203 is being used on the user device, the electronic camera is controlled by electronic application 203 and the sign language is recorded every 0.5 seconds (or another time interval based on the type of sign language and the type spoken language). Once the sign language is recorded, at step 804, the video is analyzed by electronic application 203 and/or translation system 206 to determine whether the sign language in the electronic video is clear, such that there are no blurring or other errors in the electronic video. If the electronic video is not considered to be clear (step 804—NO), then electronic application 203 may generate an electronic message (displayed on a user device screen) for a user to re-record the sign language associated with spoken language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If the electronic video is considered clear (step 804—YES), then, at step 806, the electronic video is converted into frame segments. In embodiments, each frame segment may be associated with multiple frames for each perceived word or one or more frames for each sentence in the electronic video. At step 808, electronic application 203 and/or translation system 206 queues the frames such that the frames may be further analyzed by electronic application 203 and/or translation 206. At step 810, the frames are analyzed by electronic application 203 and/or translation system 206 to determine whether each of the frames matches text associated with the sign language imagery stored in one or more databases. If each of the frames or a percentage of the frames over a particular threshold (e.g., 80%, 90%, etc.) is not matched with text in the one or more stored databases (step 812—NO), then electronic application 203 and/or translation system 206 sends an electronic message (displayed via a display screen of a user device) for a user to re-record the sign language associated with language A.

In embodiments, electronic applications 203 and/or translation system 206 may only provide a user to re-record the sign language a particular number of times (e.g., two times, three times, etc.) within a particular period of time (e.g., within five minutes, 10 minutes, etc.) before electronic applications 203 creates a time-out (e.g., one minute, two minutes, etc.) before sign language can be provided by a particular user device via electronic application 203 and/or translation system 206.

If each of the frames or a percentage of the frames over a particular threshold (e.g., 80%, 85%, etc.) matches with text stored in one or more stored databases (step 812—YES), then, at step 814, electronic application 203 and/or translation system 206 retrieves the text information from the one or more databases (step 814). In embodiments, electronic application 203 and/or translation system 206 uses a key (associated with a particular database) that is associated with a particular text. At step 816, electronic application 203 and/or translation system 206 queues the word such that the words are in a grammatically correct order as based on the requirements of language A. At 820, electronic application 203 and/or translation system 206 displays the text associated with language A that was translated from the sign language associated with language A.

Figure 9:
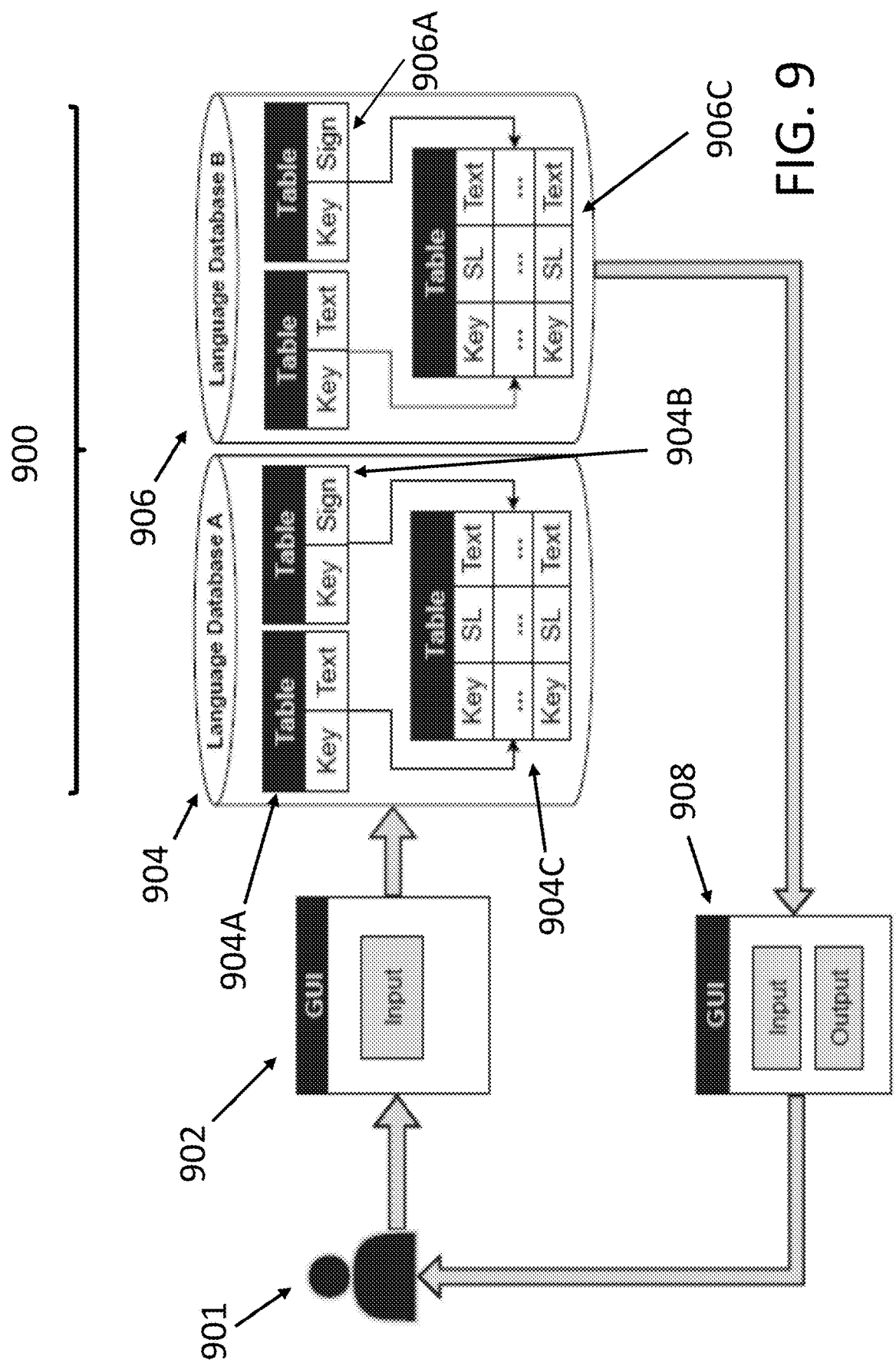
FIG. 9 is an example database system.

FIG. 9 is an example database system 900. In embodiments, example database system 900 may be a part of electronic application 203 and/or translation system 206. In embodiments, example database system 900 may include one or features described in FIG. 3. In embodiments, database system may be a data structure. Although FIG. 9 shows various fields of data (e.g., keys, text information, sign language signs, etc.), in other embodiments, database system 900 may include fewer fields, different fields, additional fields, and/or differently arranged fields than depicted in FIG. 9. In embodiments, user device 202 and/or user device 204 may store some or all of the electronic information associated with data system 900. Additionally, or alternatively, translation system 206 may store some or all of the electronic information associated with database system 900.

As shown in FIG. 9, a user 901 (who is not part of example database system 900) may input electronic information via a graphical user interface 902. In embodiments, graphical user interface 902 may be part of a user device, such as user device 202 and/or 204. In embodiments, the inputted electronic information may be text, sign language imagery recorded in an electronic video format (recorded by a camera device associated with the user device) or spoken words (also recorded by a camera device associated with the user device). FIG. 9 shows language database 904 and language database 906. As shown in FIG. 9, language database 904 may include tables 904A and 904B. In embodiments, table 904A may include one (or more) rows of data with each row of table 904A including a key and associated text; and table 904B may include one (or more) rows of data with each row of table 904B including the same key shown in table 904A but associated with associated sign language. While not shown in FIG. 9, another database table may include the same key shown in table 904A (and 904B) and associated spoken language.

In embodiments, tables 904A and 904B are both associated with a particular language (language A as shown in FIG. 9). In embodiments, tables 906A and 906B are both associated with another particular language (language B as shown in FIG. 9). In embodiments, table 906A may include one (or more) rows of data with each row of table 906A including a key and associated text; and, table 906B may include one (or more) rows of data with each row of table 906B including the same key shown in table 906A but associated with associated sign language. While not shown in FIG. 9, another database table may include the same key shown in table 906A (and 906B) and associated spoken language.

As shown in FIG. 9, tables 904A and 904B may both have a database relationship with table 904C. In embodiments, table 904C may include one or more rows of data with each row of table 904C including a key and associated text and sign language. While not shown in FIG. 9, another column in table 904C may include spoken language associated with the key.

In embodiments, whatever information is entered via user interface 902 is translated from the inputted electronic information (e.g., text, sign language, etc., with one language), based on the relationships between particular keys, text, and sign language, to an outputted electronic information (e.g., text, sign language, etc., with another language) that is displayed via user interface 908 which can be viewed by user 901 or by another user.

In embodiments, tables 904C and 906C may be created based on inputs received by a user device. In embodiments, once electronic application 203 and/or translation system 206 have translated the received electronic information into text or sign language, the electronic information stored in tables 904C and 906C may be removed from database system 900.

Figure 10B:
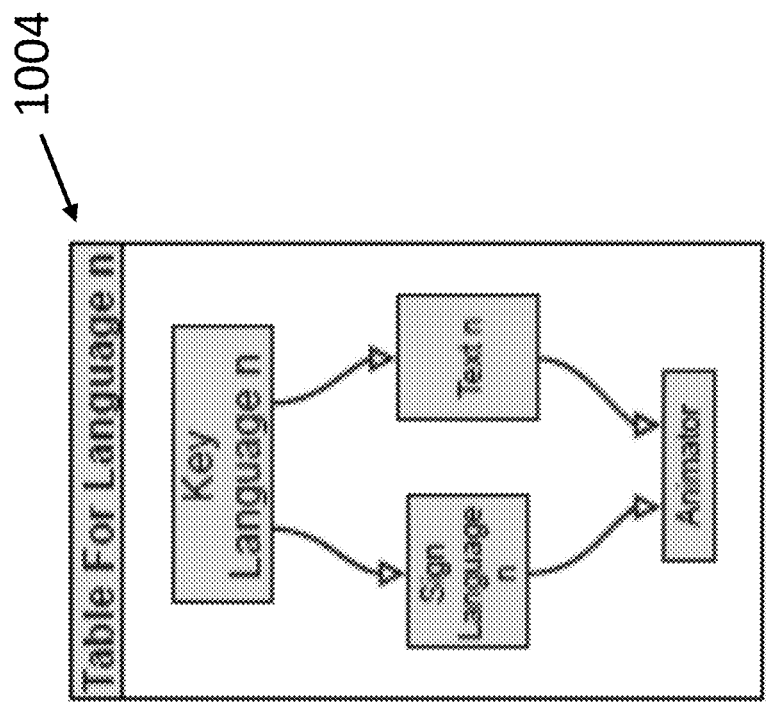
FIGS. 10A and 10B are example data relationships.
Figure 10A:
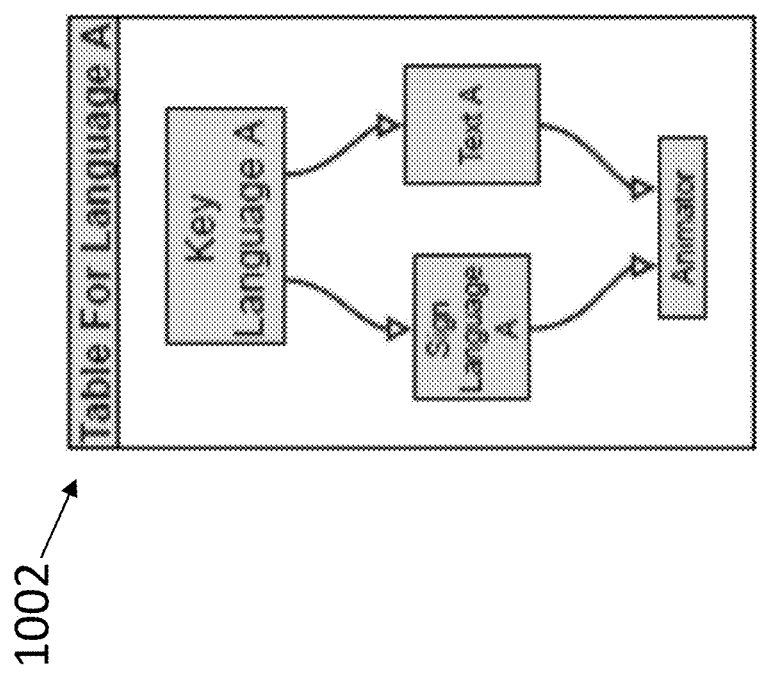

FIGS. 10A and 10B show example databases 1002 and 1004. As shown in FIG. 10A, a particular key, key language A, has an electronic relationship with sign language A and text A. FIG. 10B shows an electronic database, language database N that indicates that a particular database may include up to "N" number of language databases.

Figure 11:
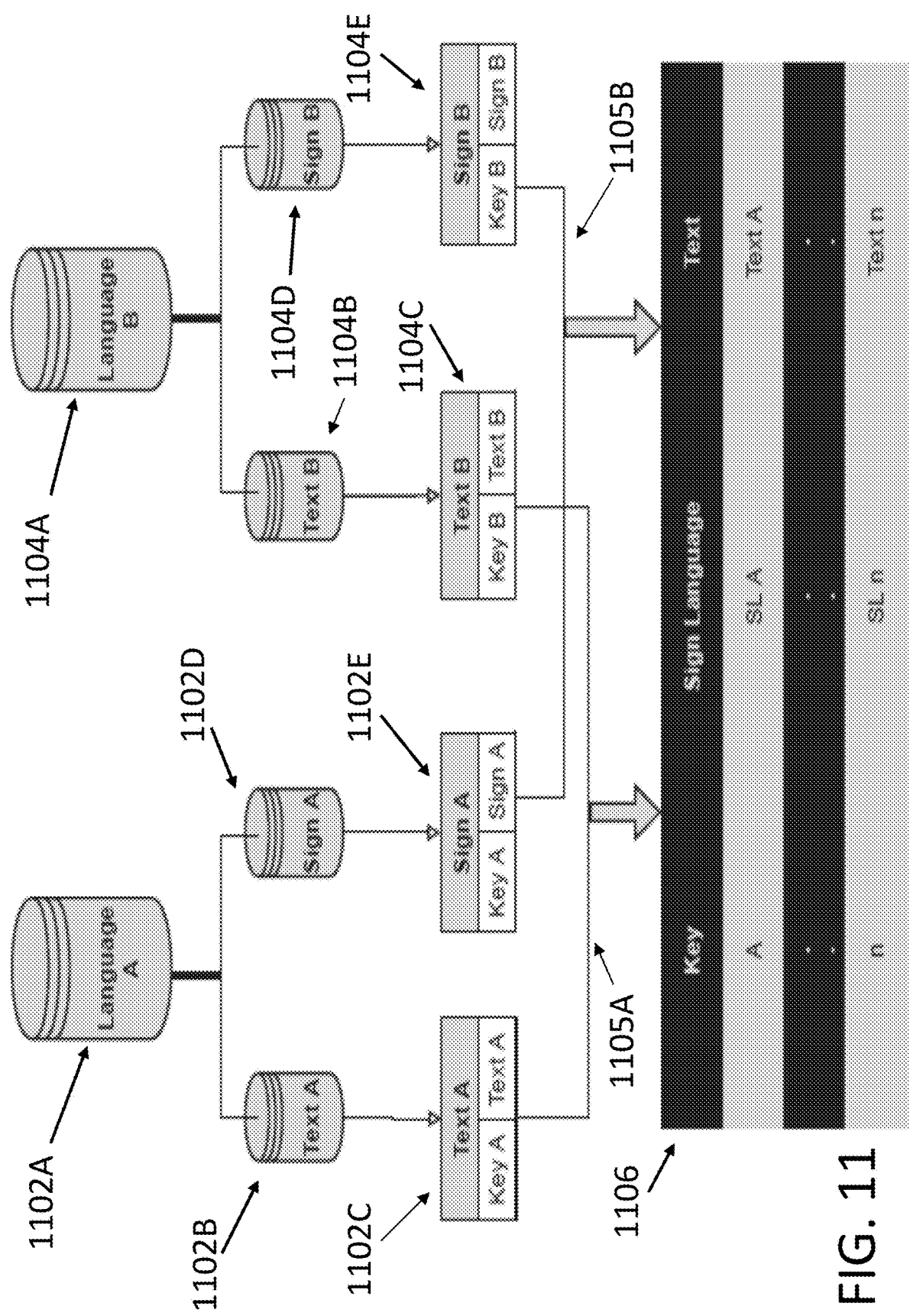
FIG. 11 is an example database system.

FIG. 11 shows an example database system 1100. In embodiments, database system may be a data structure. Although FIG. 11 shows various fields of data (e.g., keys, text information, sign language signs, etc.), in other embodiments, database system 1100 may include fewer fields, different fields, additional fields, and/or differently arranged fields than depicted in FIG. 11. In embodiments, user device 202 and/or user device 204 may store some or all of the electronic information associated with data system 1100. Additionally, or alternatively, translation system 206 may store some or all of the electronic information associated with database system 1100.

As shown in FIG. 11, database 1102A is associated with language A (e.g., English, Arabic, Japanese, etc.). In embodiments, database 1102A may include database 1102B which includes database information about text associated with language A. In embodiments, database 1102B may include a relationship between a key and text as shown in relationship 1102C. FIG. 11 also shows database 1102A including database 1102D which is associated with sign language information associated with language A. As shown in FIG. 11, database 1102D may include a relationship 1102E between a key (the same key as shown in database 1102B) and sign language A.

FIG. 11 further shows database 1104A. In embodiments, database 1104A is associated with language B (e.g., English, Arabic, Japanese, etc.). In embodiments, database 1104A may include database 1104B which includes database information about text associated with language B. In embodiments, database 1104B may include a relationship between a key and text as shown in relationship 1104C. FIG. 11 also shows database 1104A including database 1104D which is associated with sign language information associated with language B. As shown in FIG. 11, database 1104D may include a relationship 1104E between a key (the same key as shown in database 1104B) and sign language B.

FIG. 11 further shows an example relationship 1105A between database 1102C and 1104C. In embodiments, example relationship 1105A may be used to translate between text associated with language A and text associated with language B. FIG. 11 also shows example relationship 1105B between database 1102E and 1104E. Based on these relationships, table 1106 includes the relationship between each key, such as key A is related to sign language and text associated with language A.

Figure 12:
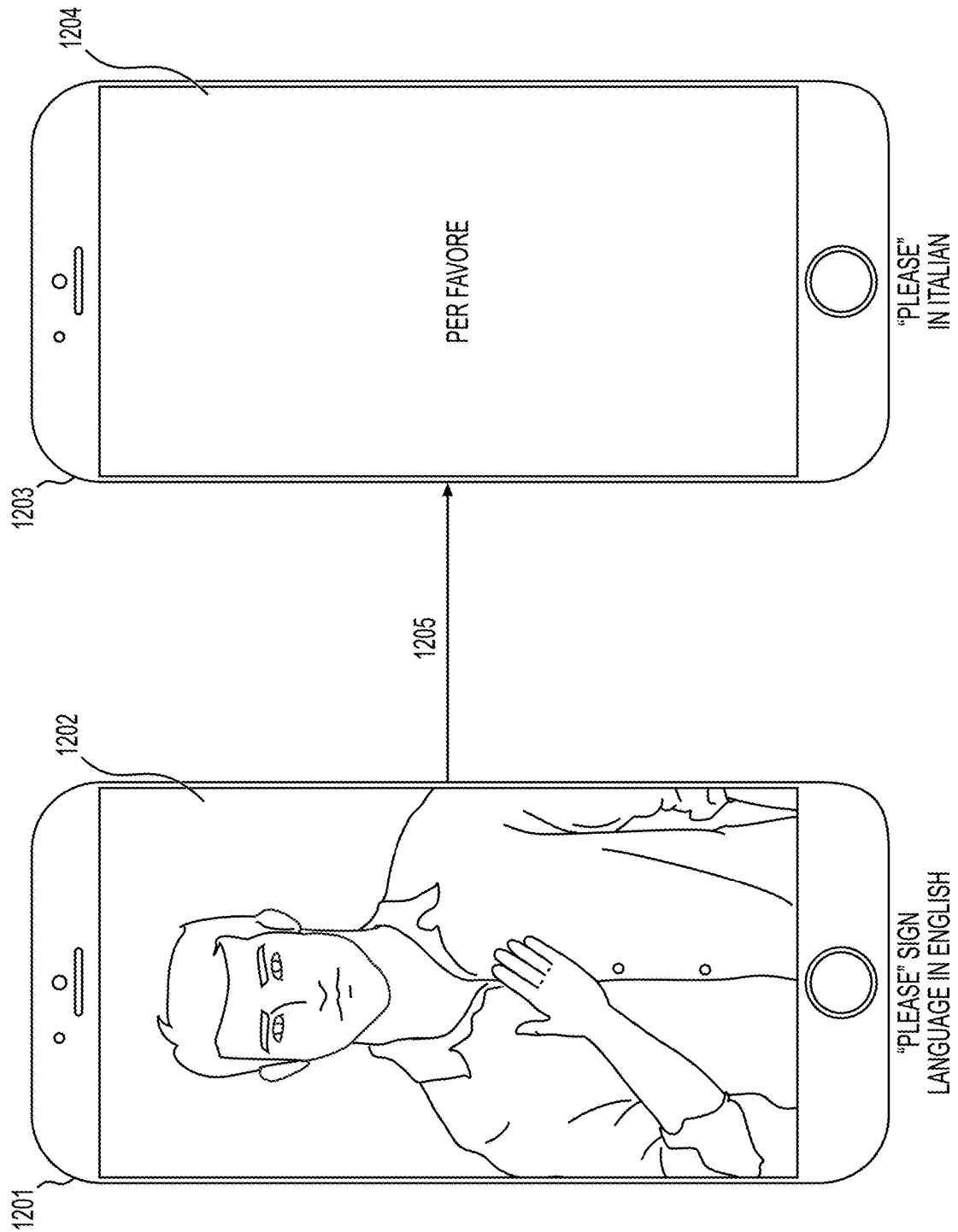
FIGS. 12, 13 14, and 15 are example translations.

FIG. 12 is an example translation. As shown in FIG. 12, electronic imagery 1202 associated with a person making sign language for "please" in English is captured on user device 1201. Based on the systems, methods, and processes described in FIGS. 1 to 11, a translation system (e.g., translation system 206) receives the sign language and translates the sign language into Italian text for please ("per favore") which is shown as electronic imagery 1204 on another user device 1203.

Figure 13:
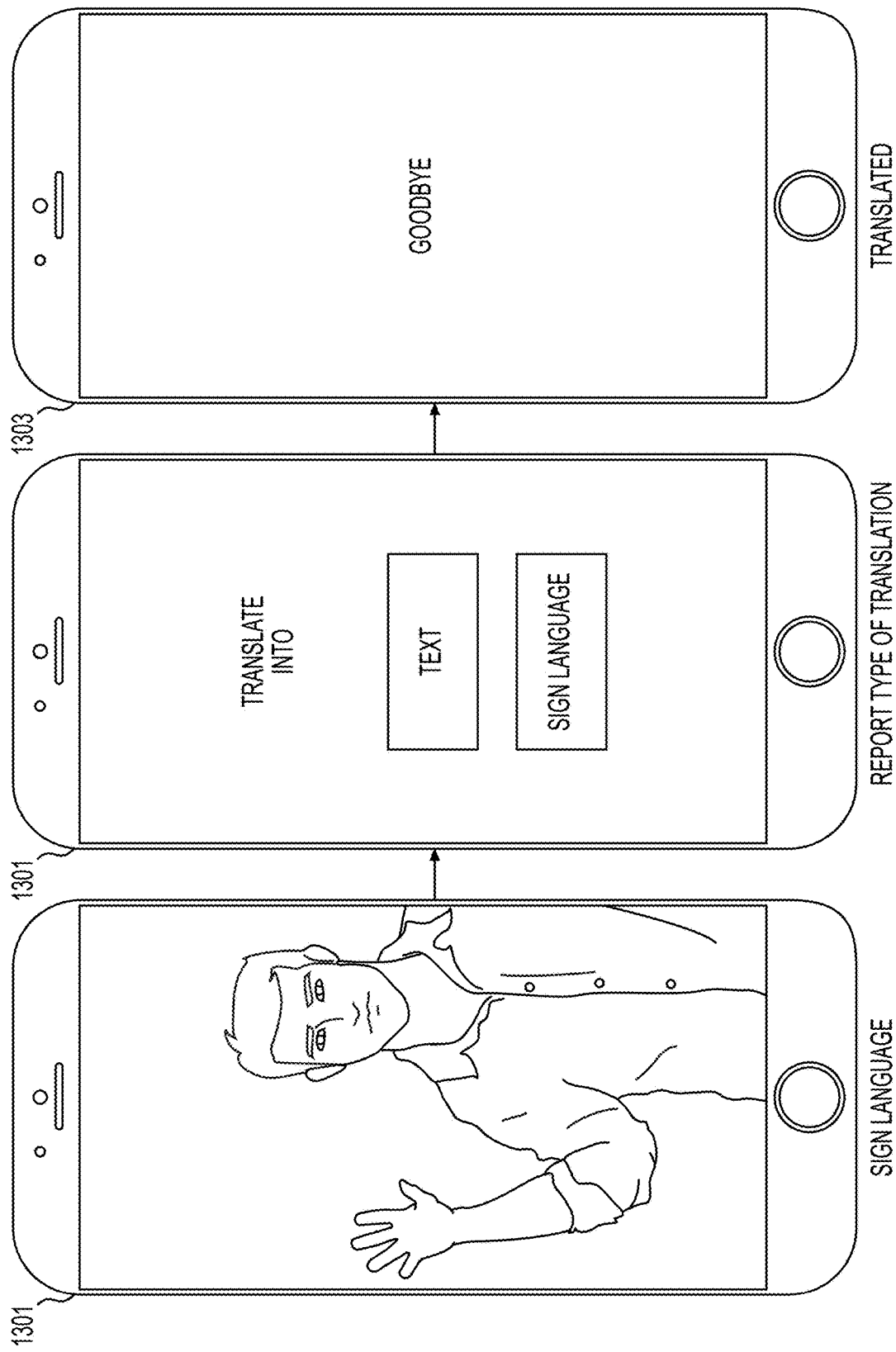

FIG. 13 is another example translation. As shown in FIG. 13, electronic imagery 1302 associated with a person making sign language for "goodbye" in English is captured on user device 1301 via an electronic application (e.g., electronic application 203). In this non-limiting example, upon receiving and processing the sign language information, electronically, device 1301, via the electronic application, may display an electronic message requesting the person who provided the sign language how to translate the sign language into either (a) text or (b) sign language based on another language. Thus, in this non-limiting example, the user device that received the initial sign language also receives additional electronic communications that instruct the electronic application (in association to one or more translation systems, such as translation system 206) to translate the sign language according to the additional electronic communications. Thus, as shown in FIG. 13, the translation of the sign language is electronically displayed on device 1303. In this non-limiting example, device 1303 may be geographically located at a distance from device 1301 such that the users of device 1301 and 1303 cannot view each other unless using their respective devices.

Figure 14:
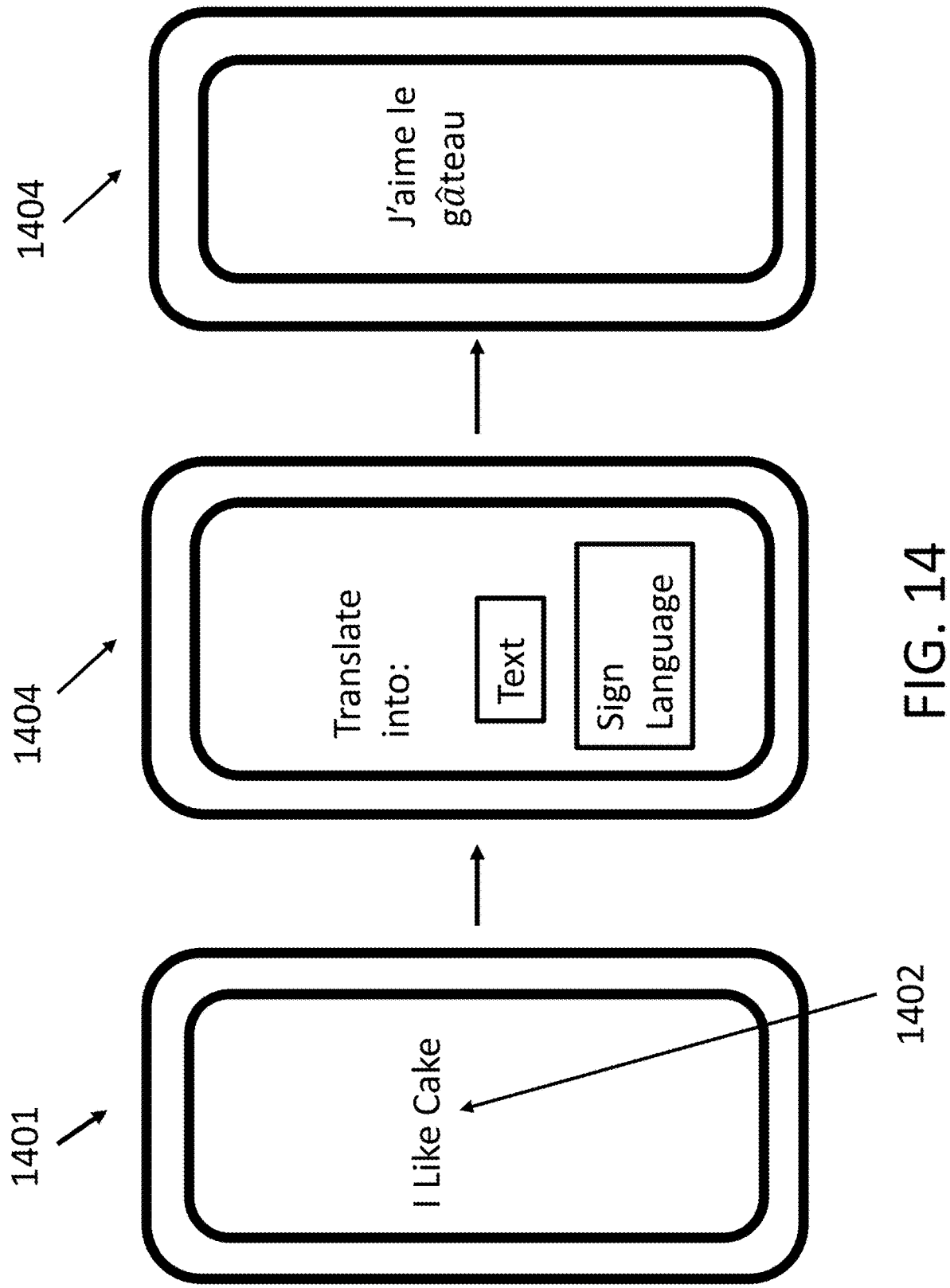

FIG. 14 is another example translation. As shown in FIG. 14, electronic imagery 1402 associated with a person entering text for "I like cake" in English is captured on user device 1401 via an electronic application (e.g., electronic application 203). In this non-limiting example, upon receiving and processing the text language information, electronically, device 1401, via the electronic application, may send an electronic message to device 1404 which display an electronic message requesting the person who provided the sign language how to translate the sign language into either (a) text or (b) sign language based on another language.

Thus, in this non-limiting example, another user device (that is different from the user device that received the initial sign language) receives additional electronic communications that instruct the electronic application (in association to one or more translation systems, such as translation system 206) to translate the sign language according to the additional electronic communications. Thus, as shown in FIG. 14, the translation of the sign language is electronically displayed on device 1404. In this non-limiting example, device 1404 may be geographically located at a distance from device 1401 such that the users of device 1401 and 1404 cannot view each other unless using their respective devices.

Figure 15:
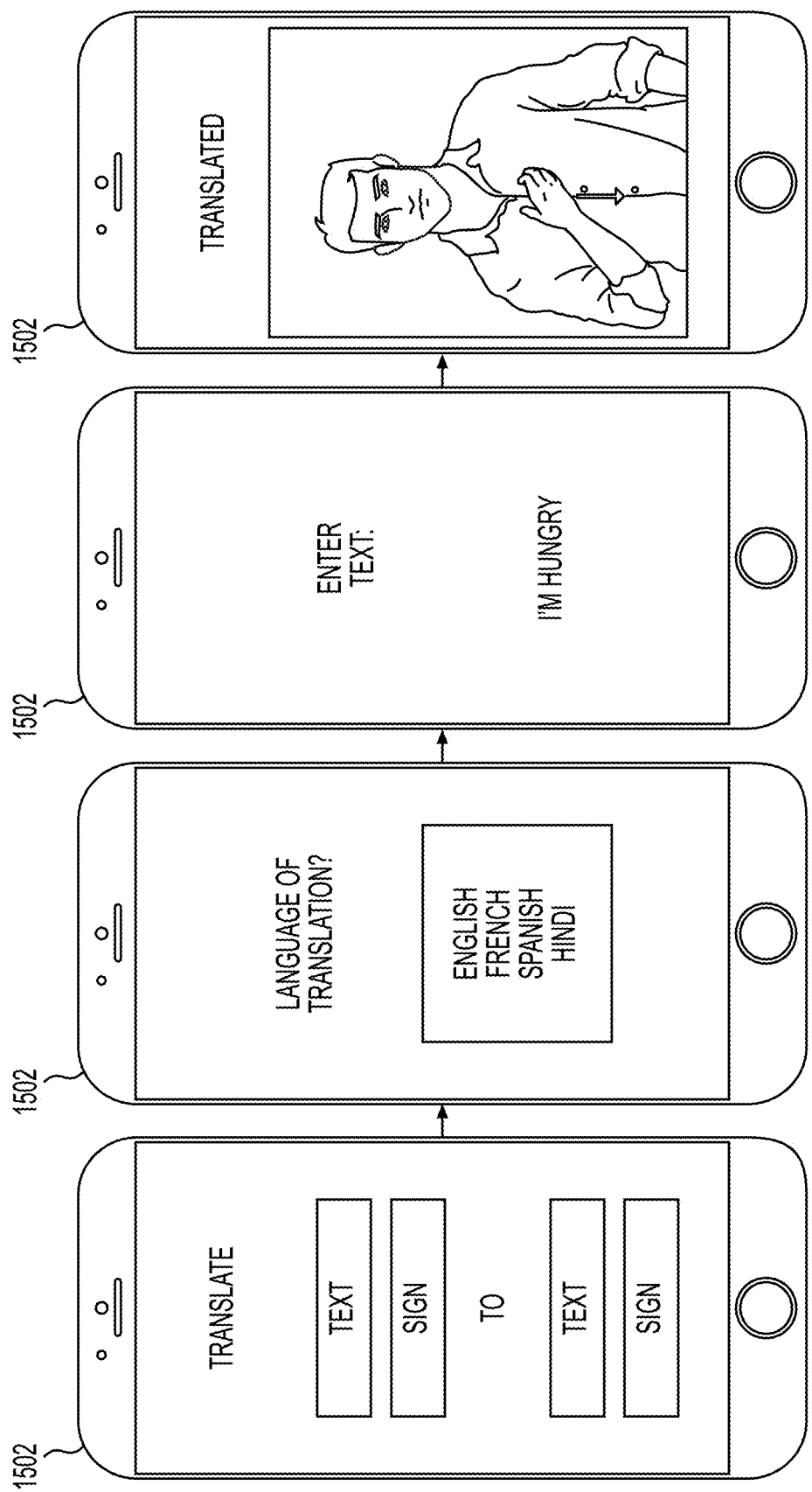

FIG. 15 is another example translation. As shown in FIG. 15, an electronic application (e.g., electronic application 203) on user device 1502 displays an electronic message requesting information about what type of translation is being request. Thus, in this non-limiting example, the electronic message provides options for text to sign, sign to text, sign to sign. In this non-limiting example, user device 1502 may receive an electronic communication requesting text to sign. Next, user device 1502 requests which language is associated with the sign language. As shown in FIG. 15, user device 1502 then, based on receiving the type of translation request and language, requests the user to provide the text language that will be electronically received. In this non-limiting example, the sign language is associated with Spanish. Once user device 1502 receives the electronic imagery of the text language, the text language is translated into the sign language associated with Spanish. Accordingly, as shown in FIG. 15, based on the initially entered text language, the Spanish sign language for "I am hungry" is displayed on user device 1502. In other examples, the translated sign language is displayed on another user device.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also, it will be understood that any of the various actions can result in any type of electronic information to be displayed in real-time and/or simultaneously on multiple user devices (e.g., similar to user device 202). For FIGS. 4, 5, 6, 7, and 8, the order of the blocks may be modified in other implementations. Further, non-dependent blocks may be performed in parallel. For FIGS. 12 to 15, while the examples are described as being conduced by an electronic application (e.g., electronic application 203), these examples may also be conducted by a translation system (e.g., translation 206) that is associated with the electronic application.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
generating, by the computing device, an electronic display that provides options to translate a first sign language phrase, wherein the options are electronically displayed at the same time and include:
translating the first sign language phrase to text written in a first language,
translating the first sign language phrase to other text written in a second language, and
translating the first sign language phrase into a second sign language;
receiving, by the computing device, electronic information requesting translating the first sign language phrase into the second sign language;
receiving, by a computing device, a first video imagery of a first sign language phrase, wherein the first sign language phrase includes multiple words in sign language format;
displaying, by the computing device, the first video imagery of the first sign language phrase, wherein the first video imagery includes movement of hand gestures;
recording, by the computing device, the first video imagery every five seconds;
receiving, by the computing device, an electronic instruction to translate the first sign language phrase;
generating, by the computing device, an electronic communication requesting any additional sign language;
translating, by the computing device, the first sign language phase into a second sign language phrase; and
generating, by the computing device, second video imagery of the second sign language phrase, wherein the second video imagery includes movement of different hand gestures and wherein the second video imagery is based on the translation of the first sign language phrase into the second sign language phrase, and wherein the second video imagery is generated by: electronically stacking second video imagery frames.

2. The electronic communications method of claim 1, wherein the first video imagery includes movements associated with the first sign language phrase.

3. The electronic communications method of claim 1, wherein the first sign language phrase is based on a different language than the second sign language phrase, wherein the first sign language is based on a first spoken language by humans and the second sign language is based on another spoken language by humans with the first spoken language being different than the second spoken language.

4. The electronic communications method of claim 1, further comprising:
splitting, by the computing device, the first video imagery into multiple frames before the first sign language phrase is translated, and wherein the translating the first sign language phrase includes:
analyzing each of the multiple frames to determine if there is stored text that matches a portion of the first sign language phrase, wherein:
the matching includes determining if a threshold percentage of the multiple frames matches the stored text, and the method further comprising:
displaying the second sign language phrase if the threshold percentage of the multiple frames matching the stored text is met.

5. The electronic communications method of claim 4, wherein the translating the first sign language phrase includes communicating with an electronic database, wherein the translating the first sign language phrase into the second sign language phrase further comprises:
matching a first key, in a first database of the electronic database, to a first sign language, wherein the first key is also matched to text in the first database and the first database is a first language database;
matching a second key, in a second database of the electronic database, to a second sign language, wherein the second key is also matched to other text in the second database and the second database is a second language database; and matching the first key to the second key, wherein the matching the first key and the second key results in the translating the first sign language phrase into the second sign language phrase, and wherein:

the displaying of the options of translating the first sign language phrase to text written in a first language, translating the first sign language phrase to other text written in a second language, and translating the first sign language phrase into a second sign language is based on:

the first key being matched to the first sign language and the text and the second key being matched to the second sign language and the first key.

6. The electronic communications method of claim 5, wherein the electronic database includes at least one text language database.

7. The electronic communications method of claim 6, wherein the first database is a sign language database including an electronic relationship with the at least one text language database.

8. The electronic communications method of claim 1, wherein the translating the first sign language phrase includes communicating with an electronic database, wherein the translating the first sign language phrase into the second sign language phrase further comprising:

matching a first key, in a first database of the electronic database, to a first sign language;
matching a second key, in a second database of the electronic database, to a second sign language; and
matching the first key to the second key, wherein the matching the first key and the second key results in the translating the first sign language phrase into the second sign language phrase.

9. A device, comprising:
memory; and
a processor to:
generate an electronic display that provides options to translate a first sign language phrase, wherein the options are electronically displayed at the same time and include:
translate the first sign language phrase to text written in a first language,
translate the first sign language phrase to other text written in a second language, and
translate the first sign language phrase into a second sign language;
receive electronic information that requests translating the first sign language phrase into the second sign language;
receive a first video imagery of a first sign language phrase, wherein the first sign language phrase includes multiple words in sign language format;
display the first video imagery of the first sign language phrase, wherein the first video imagery includes movement of hand gestures;
record the first video imagery every five seconds;
receive an electronic instruction to translate the first sign language phrase;
generate an electronic communication requesting any additional sign language;
translate the first sign language phase into a second sign language phrase; and
generate second video imagery of the second sign language phrase, wherein the second video imagery includes movement of different hand gestures and wherein the second video imagery is based on the translation of the first sign language phrase into the second sign language phrase, and wherein the second video imagery is generated by:
electronically stacking second video imagery frames.

10. The device of claim 9, wherein the first video imagery includes movements associated with the first sign language phrase.

11. The device of claim 9, wherein the translating the first sign language phrase to text includes the processor to:
communicate with an electronic database, wherein the electronic database includes multiple text databases.

12. The device of claim 9, wherein the sign language is electronically displayed in a video.

13. The device of claim 9, wherein the processor is further to:
split first video imagery into multiple frames before the first sign language phrase is translated, and wherein the translating the first sign language phrase includes:
analyze each of the multiple frames do determine if there is stored text that matches a portion of the first sign language phrase, wherein:
the matching includes determining if a threshold percentage of the multiple frames matches the stored text, and the process is further to:
display the second sign language phrase if the threshold percentage of the multiple frames matching the stored text is met.

14. The device of claim 9, wherein the first sign language phrase is based on a different language than the second sign language phrase, and wherein the first sign language is based on a first spoken language by humans and the second sign language is based on another spoken language by humans with the first spoken language being different than the second spoken language.

* * * * *